(12) United States Patent
Huang et al.

(10) Patent No.: US 7,768,579 B2
(45) Date of Patent: Aug. 3, 2010

(54) VIDEO AND AUDIO SYSTEM CAPABLE OF SAVING ELECTRIC POWER

(75) Inventors: Wei-Chih Huang, Taipei (TW); Chiung-Ying Peng, Taipei (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 1126 days.

(21) Appl. No.: 11/381,541

(22) Filed: May 4, 2006

(65) Prior Publication Data
US 2007/0132890 A1 Jun. 14, 2007

(30) Foreign Application Priority Data
Dec. 8, 2005 (TW) .............................. 94143417 A

(51) Int. Cl.
*H04N 5/63* (2006.01)
(52) U.S. Cl. .................. 348/730; 348/705; 713/320
(58) Field of Classification Search ................. 348/372, 348/730, 705, 706; 713/320
See application file for complete search history.

(56) References Cited

U.S. PATENT DOCUMENTS

| | | | | |
|---|---|---|---|---|
| 5,396,107 A * | 3/1995 | Shoji | ..... | 307/134 |
| 5,808,693 A * | 9/1998 | Yamashita et al. | ..... | 348/554 |
| 6,085,017 A * | 7/2000 | Rilly | ..... | 386/46 |
| 6,115,033 A * | 9/2000 | Choi | ..... | 345/211 |
| 6,151,652 A * | 11/2000 | Kondo et al. | ..... | 713/300 |
| 6,580,460 B1 * | 6/2003 | Takahashi et al. | ..... | 348/372 |
| 6,661,462 B2 * | 12/2003 | Ohnogi | ..... | 348/372 |
| 6,690,431 B1 * | 2/2004 | Yang et al. | ..... | 348/706 |
| 7,050,049 B2 * | 5/2006 | Byun | ..... | 345/211 |
| 7,138,928 B2 * | 11/2006 | Dischert | ..... | 340/825.72 |
| 7,453,678 B2 * | 11/2008 | Beneditz et al. | ..... | 361/93.2 |
| 7,595,847 B2 * | 9/2009 | Chou et al. | ..... | 348/790 |
| 2001/0015771 A1 * | 8/2001 | Kishimoto et al. | ..... | 348/705 |
| 2002/0031350 A1 * | 3/2002 | Ohnogi | ..... | 396/429 |
| 2006/0119742 A1 * | 6/2006 | Park | ..... | 348/730 |

* cited by examiner

*Primary Examiner*—Brian P Yenke
(74) *Attorney, Agent, or Firm*—Winston Hsu

(57) ABSTRACT

A power supply of a video and audio system is coupled to a first switch and a second switch. A power management unit is coupled between the first switch and at least one electronic device. An integrated circuit includes a first circuit and a second circuit. The first circuit is coupled to the power management unit and the at least one electronic device for controlling the operation of the at least one electronic device. The second circuit is coupled to a battery, the first switch, the second switch, and the first circuit for controlling the first switch and the second switch.

6 Claims, 2 Drawing Sheets

VIDEO AND AUDIO SYSTEM CAPABLE OF SAVING ELECTRIC POWER

BACKGROUND OF THE INVENTION

1. Field of the Invention

The present invention relates to a video and audio system, and more particularly, to a video and audio system capable of saving electric power.

2. Description of the Prior Art

Please refer to FIG. 1, which is a diagram of a TV system 1 according to the prior art. The TV system 1 comprises a TV tuner 11, an audio processor 13, a TV decoder 15, a main integrated circuit (IC) 14, a power management unit 12, and a power supply 10.

The main IC 14 comprises a microcontroller unit (MCU) 142 and a video processor 141. The MCU 142 controls the operations of the TV tuner 11, the audio processor 13, the TV decoder 15, and the video processor 141. The power management unit 12 receives electric power from the power supply 10, and provides required operation voltages to the TV tuner 11, the audio processor 13, the TV decoder 15, and the main IC 14 correspondingly.

When the TV system 1 is turned off, the MCU 142 sends signals to the TV tuner 11, the audio processor 13, the TV decoder 15, and the video processor 141 to stop all operations. However, the MCU 142 must be in operation all the time to receive input signals, such as signals related to turning on the TV system 1 or setting the time. Since the MCU 142 must react to all input signals immediately, the path of electric power cannot be disconnected, resulting in a constant small current flow from the power management unit 12 to the TV tuner 11, the audio processor 13, and the TV decoder 15. This wastes electric power. With the current trend towards natural and green goods, saving power has become important.

SUMMARY OF THE INVENTION

The claimed invention discloses a video and audio system. The video and audio system comprises a power supply, a first switch coupled to the power supply, a second switch coupled to the power supply, a battery coupled to the second switch, a power management unit coupled to the first switch, at least one electronic device coupled to the power management unit, and an integrated circuit. The integrated circuit comprises a first circuit and a second circuit. The first circuit is coupled to the power management unit and the at least one electronic device. The second circuit is coupled to the battery, the first switch, the second switch, and the first circuit. The first circuit controls the operation of the at least one electronic device, and the second circuit controls the first switch and the second switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
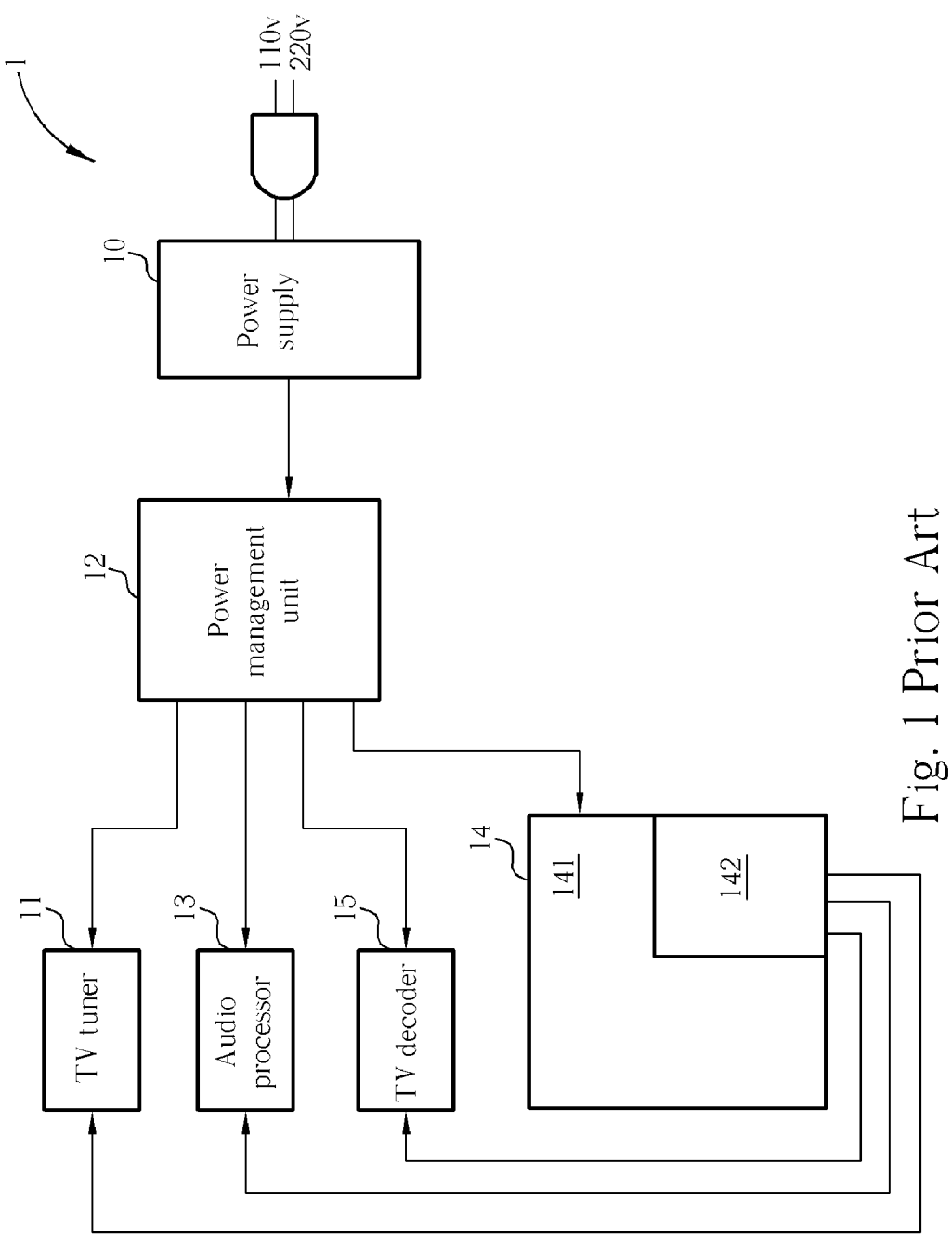
FIG. 1 is a diagram of a TV system according to the prior art.
Figure 2:
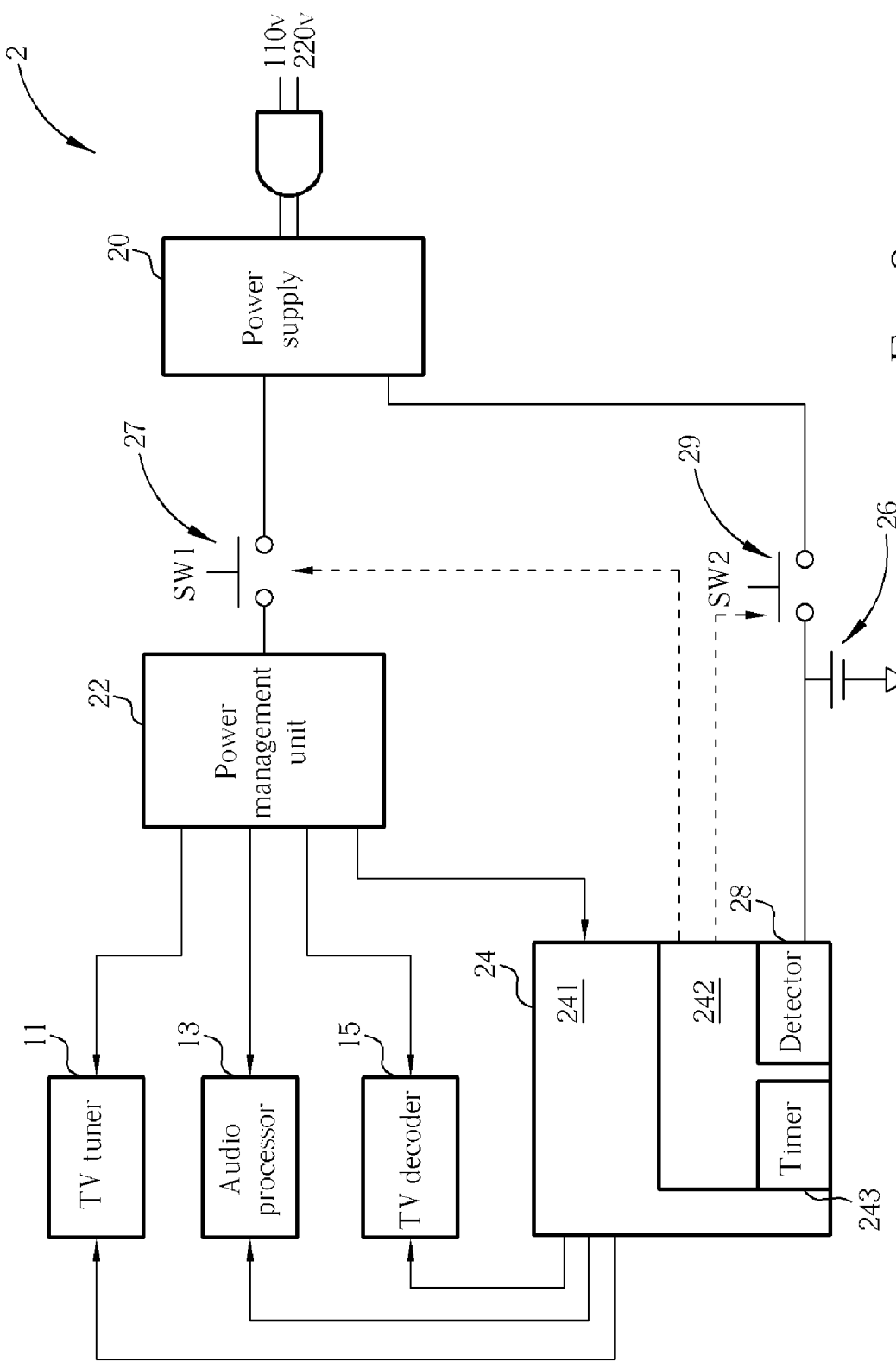
FIG. 2 is a diagram of a video and audio system according to the present invention.

Please refer to FIG. 2, which is a diagram of a video and audio system 2 according to the present invention. The video and audio system 2 comprises a TV tuner 11, an audio processor 13, a TV decoder 15, a main IC 24, a power management unit 22, a power supply 20, a battery 26, a first switch (SW1) 27, and a second switch (SW2) 29.

The main IC 24 comprises a first circuit 241 and a second circuit 242, a transmission interface being between the first circuit 241 and the second circuit 242. The second circuit 242 controls the first switch 27 and the second switch 29. When the second circuit 242 turns on the first switch 27, the power supply 20 provides electric power to the power management unit 22. Then, the power management unit 22 provides electric power to the first circuit 241. The second circuit 242 sends a command to start the first circuit 241 via the transmission interface, so that the first circuit 241 can control the TV tuner 11, the audio processor 13, and the TV decoder 15 utilizing the electric power provided by the power management unit 22.

The power supply 20 provides electric power to the power management unit 22, and then the power management unit 22 provides electric power to the TV tuner 11, the audio processor 13, the TV decoder 15, and the first circuit 241 according to required operation voltages of the TV tuner 11, the audio processor 13, the TV decoder 15, and the first circuit 241. The battery 26 provides power to the second circuit 242.

When the video and audio system 2 is turned on, the second circuit 242 turns on the first switch 27 so that the power supply 20 provides electric power to the TV tuner 11, the audio processor 13, the TV decoder 15, and the first circuit 241 via the power management unit 22. When the video and audio system 2 is turned off, the second circuit 242 turns off the first switch 27, and thereby disconnects the power supply 20 and the power management unit 22, and no current flows to the power management unit 22.

Since the second circuit 242 includes a real time clock and manages all received signals from a remote control or buttons of the video and audio system 2, the second circuit 242 must stay in an operational mode all the time. That is, no matter whether the video and audio system 2 is turned on or not, electric power must be provided to the second circuit 242 constantly. The video and audio system 2 of present invention separates the power transmission paths into the first circuit 241 and the second circuit 242 of the main IC 24. Even if the video and audio system 2 is turned off, the second circuit 242 still receives electric power from the battery 26 for operating normally.

Additionally, the second circuit 242 comprises a detector 28 coupled to the second circuit 242 and the battery 26. When the detector 28 detects that the voltage of the battery 26 is lower than a predetermined voltage, the second circuit 242 turns on the second switch 29 accordingly, so that the power supply 20 charges the battery 26 to provide electric power to the second circuit 242 for operation. According to another embodiment of present invention, the second circuit 242 periodically turns on the second switch 29 when a time duration of turning off the second switch 29 reaches a predetermined duration calculated by a timer 243 of the second circuit 242, and thereby the battery 26 is periodically charged.

The video and audio system 2 of the present invention can be a TV system or other multimedia systems, such as a DVD player. The power control system of the present invention can be implemented in general electronic products for saving electric power. Electronic devices coupled to the power management unit 22 are not limited to the TV tuner 11, the audio processor 13, and the TV decoder 15. The second circuit 242 can be a microcontroller unit to control the operation of the video and audio system 2. The power supply 20 can be a power supply capable of automatically transferring voltages.

When the video and audio system is turned off, the present invention completely disconnects the power transmission path between the power supply and the power management unit for saving electric power. In addition, the present invention uses a storage battery to provide electric power to the microcontroller unit. Even though the video and audio system is turned off, the microcontroller unit still has electric power to receive input signals or perform other functions, such as setting time, so that the video and audio system can be operated normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video and audio system comprising:
a first switch serially coupled between a power supply and a power management unit selectively electrically disconnecting the power supply from the power management unit when the video and audio system is shut down;
at least one electronic device coupled to the power management unit;
a first circuit coupled to the power management unit and the at least one electronic device, the first circuit controlling the operation of the at least one electronic device;
a second switch serially coupled between the power supply and a second circuit selectively electrically connecting or electrically disconnecting the power supply and the second circuit, the second circuit coupled to a control terminal of the first switch for controlling the first switch, and a control terminal of the second switch for controlling the second switch; and
a battery coupled to the second circuit.

2. The video and audio system of claim 1, wherein the second circuit further comprises a timer for calculating a time duration, wherein when the time duration calculated by the timer reaches a predetermined duration, the second circuit turns on the second switch periodically so that the battery is charged by the power supply.

3. The video and audio system of claim 1, further comprising a detector coupled to the second circuit and the battery for detecting a voltage of the battery, wherein when the voltage of the battery is lower than a predetermined voltage, the second circuit turns on the second switch so that the battery is charged by the power supply.

4. The video and audio system of claim 1, wherein the power supply is a power supply capable of automatically transferring voltages.

5. The video and audio system of claim 1, wherein the second circuit is a microcontroller unit.

6. The video and audio system of claim 1, wherein the at least one electronic device is selected from the group consisting of a TV decoder, an audio processor, and a TV tuner.

* * * * *